United States Patent
Goto et al.

(10) Patent No.: US 7,937,087 B2
(45) Date of Patent: May 3, 2011

(54) RADIO COMMUNICATION SYSTEM, RADIO COMMUNICATION METHOD AND BASE STATION

(75) Inventors: Yoshikazu Goto, Yokosuka (JP); Akihito Hanaki, Yokohama (JP); Takahiro Hayashi, Yokosuka (JP); Junichiro Kawamoto, Tokyo (JP); Yukiko Takagi, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 410 days.

(21) Appl. No.: 12/246,689

(22) Filed: Oct. 7, 2008

(65) Prior Publication Data

US 2009/0093254 A1    Apr. 9, 2009

(30) Foreign Application Priority Data

Oct. 9, 2007    (JP) ............................. JP2007-263669

(51) Int. Cl.
*H04M 36/00*    (2006.01)
(52) U.S. Cl. .................... 455/437; 455/561; 370/332
(58) Field of Classification Search .................. None
See application file for complete search history.

(56) References Cited

U.S. PATENT DOCUMENTS
2008/0051096 A1    2/2008    Rao

FOREIGN PATENT DOCUMENTS
EP    1696614 A1    8/2006
EP    1821558 A1    8/2007

OTHER PUBLICATIONS

3GPP TS 25.309 version 6.6.0 Release 6 (Mar. 2006), pp. 21-24.*
3GPP TS 25.321 V7.5.0 (Jun. 2007), 3rd Generation Partnership Project; Technical Specification Group Radio Access Network; Medium Access Control (MAC) protocol specification (Release 7), 141 pages.
NTT DoCoMo: "Control over serving vs. non-serving E-DCH resource allocation"; 9.2 FDD Enhanced Uplink—Timing. HARQ and Scheduling: Discussion and Decision: TSG-RAN Working Group 1#40 meeting: pp. 1-3 (Feb. 14-18, 2005) (Cited in the counterpart Korean official action).

* cited by examiner

*Primary Examiner* — Kent Chang
*Assistant Examiner* — German Viana Di Prisco
(74) *Attorney, Agent, or Firm* — Marvin A. Motsebocker; MOTS Law, PLLC (57)    ABSTRACT

A radio communication system includes: a serving cell (for example, cell A functional unit 120) configured to transmit, to a radio terminal 10, an AG for directly specifying an uplink user data transmission rate and an RG for relatively specifying the uplink user data transmission rate; and a non-serving cell (for example, cell B functional unit 130) configured to transmit the RG to the radio terminal without transmitting the AG. The non-serving cell includes an instruction unit 132 configured to instruct the serving cell to decrease the uplink user data transmission rate, when a reception power of uplink user data received from the radio terminal 10 exceeds a predetermined interference threshold.

10 Claims, 8 Drawing Sheets

RADIO COMMUNICATION SYSTEM, RADIO COMMUNICATION METHOD AND BASE STATION

CROSS REFERENCE TO RELATED APPLICATION

This application is based upon and claims the benefit of priority from prior Japanese Patent Application No. 2007-263669, filed on Oct. 9, 2007; the entire contents of which are incorporated herein by reference.

BACKGROUND OF THE INVENTION

1. Field of the Invention

The present invention relates to a radio communication system, a radio communication method, and a base station, which include a serving cell transmitting an absolute grant and a relative grant to a radio terminal, and a non-serving cell transmitting the relative grant to the radio terminal without transmitting the absolute grant.

2. Description of the Related Art

Heretofore, a radio communication system including a base station and a radio network controller has been known. In the radio communication system, the base station has a single or multiple cells, and a radio communication is performed between each of the cells and a plurality of radio terminals. The radio network controller controls a plurality of base stations, and assigns radio resources to the plurality of radio terminals. Note that such a technique (hereinafter referred to as first technique) is sometimes referred to as R99 (Release 99) or the like.

For the purpose of improving the throughput and shortening the delay time, and the like, there has recently been proposed a technique in which a base station assigns the radio resources to uplink user data transmitted from each of the radio terminals to the base station (network side). Note that such a technique (hereinafter referred to as a second technique) is sometimes referred to as the high speed uplink packet access (HSUPA), the enhanced uplink (EUL) or the like.

Each of the cells functions as a serving cell or as a non-serving cell. A transport block size (TBS) is determined based on the transmission rate (for example, a scheduling grant (SG)) of the uplink user data, and is controlled by transmission rate control data transmitted from the serving cell and the non-serving cell. The transmission rate control data includes an absolute grant (AG) for controlling an absolute value of the transmission rate, and a relative grant (RG) for controlling a relative value of the transmission rate (for example, see 3GPP TS25.321 Ver. 7.5.0).

Here, the uplink user data is transmitted to the base station from the radio terminals via an enhanced dedicated physical data channel (E-DPDCH). The absolute grant (AG) is transmitted from the radio base station to the radio terminals via an E-DCH absolute grant channel (E-AGCH). The relative grant (RG) is transmitted from the radio base station to the radio terminals via an E-DCH relative grant channel (E-RGCH).

The serving cell transmits the absolute grant (AG) and the relative grant is (RG) to the radio terminals. Meanwhile, the non-serving cell transmits, to the radio terminals, only the relative grant (RG) without transmitting the absolute grant (AG).

SUMMARY OF THE INVENTION

In the radio communication system, a state where a radio terminal is connected to multiple cells (i.e., a handover state) can be considered.

In the above-described first technique, in the handover state, each of the cells reports, to the radio network controller, whether or not the cell has successfully received uplink user data transmitted from the radio terminal. The radio network controller instructs the radio terminal to decrease the transmission power of the uplink user data when any of the cells successfully receives the uplink user data. When all of the cells cannot receive the uplink user data from the radio terminal, the radio network controller instructs the radio terminal to increase the transmission power of the uplink user data. Thus, the increase of the transmission power of the uplink user data is suppressed, whereby interference power in each of the cells is suppressed.

On the other hand, the suppression of the interference power in each of the cells is also important for the above-described second technique. However, in the second technique, it is not effective to perform the transmission power control at the radio network controller. Specifically, in the second technique, a base station assigns the radio resources to shorten a delay time. Accordingly, the transmission power control at the radio network controller causes an increase of the delay time. Therefore, in the second technique, the radio network controller does not perform the transmission power control.

In addition, the non-serving cell does not recognize the transmission rate assigned to the radio terminals using the other cell as the serving cell. Accordingly, although the non-serving cell can transmit the RG (decrease command), the non-serving cell cannot appropriately control the interference power (that is, the transmission power received from the radio terminal using the other cells as the serving cells when the radio terminal transmits various data).

An aspect of the present invention is summarized as a radio communication system including: a serving cell (for example, cell A functional unit 120) configured to transmit, to a radio terminal, an absolute grant for directly specifying an uplink user data transmission rate and a relative grant for relatively specifying the uplink user data transmission rate; and a non-serving cell (for example, cell B functional unit 130) configured to transmit the relative grant to the radio terminal without transmitting the absolute grant. The non-serving cell includes an instruction unit (instruction unit 132) configured to instruct the serving cell to decrease the uplink user data transmission rate, when a reception power of uplink user data exceeds a predetermined interference threshold.

According to this aspect, when the reception power (interference power) of the uplink user data exceeds the predetermined interference threshold, the non-serving cell instructs the serving cell to decrease the uplink user data transmission rate.

In other words, since the serving cell decreases the transmission rate assigned to the radio terminal, it is possible to appropriately suppress the interference power caused to the non-serving cell of, without depending on the radio network controller. Note that, it is needless to say that the serving cell recognizes the transmission rate assigned to the radio terminal.

In the above-described aspect, the non-serving cell includes a first selection unit (selection unit 134) configured to select, from a plurality of radio terminals, a radio terminal whose uplink user data transmission rate is to be decreased, when the reception power of the uplink user data exceeds the predetermined interference threshold. The instruction unit notifies, to the serving cell, the radio terminal selected by the first selection unit.

In the above-described aspect, the non-serving cell includes a first determination unit (determination unit 135)

configured to determine a decrease amount of the uplink user data transmission rate, when the reception power of the uplink user data received from the radio terminal exceeds the predetermined interference threshold. The instruction unit notifies, to the serving cell, the decrease amount determined by the first determination unit.

In the above-described aspect, the serving cell includes a second selection unit (selection unit 125) configured to select, from a plurality of radio terminals, a radio terminal whose uplink user data transmission rate is to be decreased, when the non-serving cell instructs the serving cell to decrease the uplink user data transmission rate.

In the above-described aspect, the serving cell includes a second determination unit (determination unit 126) configured to determine a decrease amount of the uplink user data transmission rate, when the non-serving cell instructs the serving cell to decrease the uplink user data transmission rate.

In the above-described aspect, the second selection unit selects a radio terminal having an uplink user data transmission rate larger than a predetermined transmission rate.

In the above-described aspect, the second selection unit selects a radio terminal performing a handover from the serving cell to the non-serving cell.

In the above-described aspect, the decrease amount is determined not to decrease the uplink user data transmission rate to below a predetermined transmission rate.

One aspect of the present invention is summarized as a radio communication method including a serving cell configured to transmit, to a radio terminal, an absolute grant for directly specifying an uplink user data transmission rate and a relative grant for relatively specifying the uplink user data transmission rate; and a non-serving cell configured to transmit the relative grant to the radio terminal without transmitting the absolute grant. The radio communication method includes: instructing, from the non-serving cell to the serving cell, to decrease the uplink user data transmission rate, when a reception power of uplink user data exceeds a predetermined interference threshold.

One aspect of the present invention is summarized as a base station provided in a radio communication system including: a serving cell configured to transmit, to a radio terminal, an absolute grant for directly specifying an uplink user data transmission rate and a relative grant for relatively specifying the uplink user data transmission rate; and a non-serving cell configured to transmit the relative grant to the radio terminal without transmitting the absolute grant. The base station includes the non-serving cell, and the non-serving cell includes an instruction unit configured to instruct the serving cell to decrease the uplink user data transmission rate when a reception power of uplink user data exceeds a predetermined interference threshold.

DESCRIPTION OF THE EMBODIMENTS

With reference to the accompanying drawings, a radio communication system according to an embodiment of the present invention will be described below. Note that, in the following description of the drawings, the same or similar parts will be denoted by the same or similar reference numerals.

However, it should be noted that the drawings are schematic and ratios of dimensions and the like are different from actual ones. Therefore, specific dimensions and the like should be determined by taking into consideration the following description. Moreover, as a matter of course, also among the drawings, there are included portions in which dimensional relationships and ratios are different from each other.

First Embodiment (Configuration of Radio Communication System)

Figure 1:
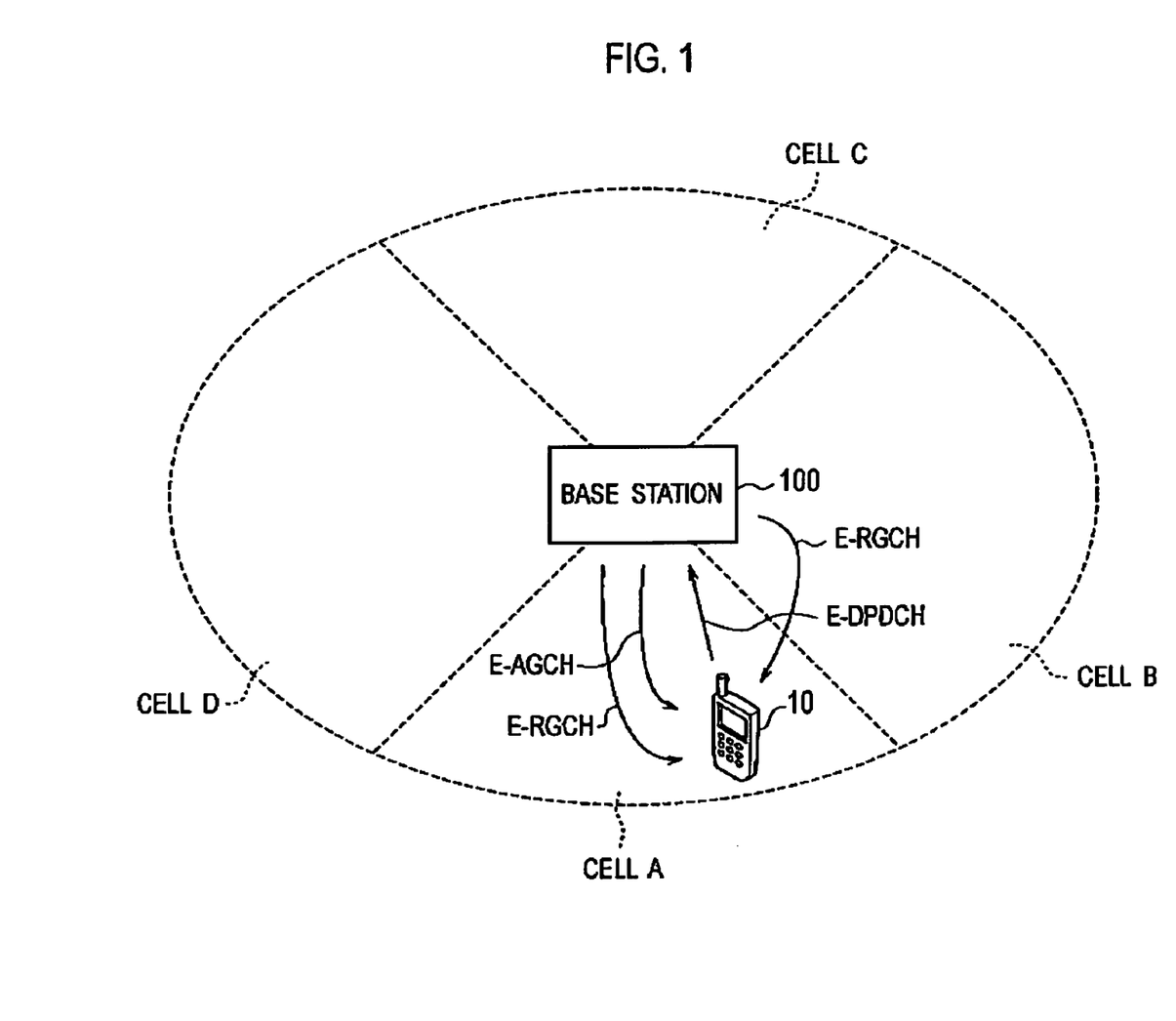
FIG. 1 is a view showing a radio communication system according to a first embodiment.

With reference to the accompanying drawings, a configuration of a radio communication system according to a first embodiment will be described below. FIG. 1 is a view showing the radio communication system according to the first embodiment. As shown in FIG. 1, the radio communication system includes a radio terminal 10 and a base station 100.

The radio terminal 10 transmits uplink user data to the base station 100. Specifically, the radio terminal 10 transmits the uplink user data to the base station 100 via a dedicated physical data channel (DPDCH) in a framework in which the radio network controller assigns radio resources and the like. Note that such framework is sometimes referred to as R99 (Release 99) or the like.

In this framework, the radio terminal 10 transmits uplink control data to the base station 100 via a dedicated physical control channel (DPCCH).

Meanwhile, the radio terminal 10 transmits the uplink user data to the base station 100a via an enhanced dedicated physical data channel (E-DPDCH), in a framework in which the base station 100 assigns radio resources and the like. Note that this framework is sometimes referred to as the high speed uplink packet access (HSUPA), the enhanced uplink (EUL) or the like.

Here, the uplink user data is divided into blocks for each transmission is time interval (TTI), that is, for each process (HARQ process). Each of the blocks (MAC-e PDU) is transmitted by use of a process (hereinafter referred to as an active process) assigned to the radio terminal 10.

Moreover, one cycle (HARQ RTT) is configured of a predetermined number of processes (process #1 to process #n) and each of the cycle is repeated. Note that the number of processes included in one cycle is set according to a TTI length. For example, when the TTI length is 2 ms, the number of processes included in one cycle is "8". When the TTI length is 10 ms, the number of processes included in one cycle is "4".

Note that, the radio terminal 10 transmits not only the uplink user data via data channel such as DPDCH or E-DPDCH but also transmits the uplink control data via control channels such as the dedicated physical control channel (DPCCH) or the enhanced dedicated physical control channel (E-DPCCH).

The base station 100 controls a plurality of cells (cells A to D), and each of the cells communicates with the radio terminal 10 located in the each of the cells. Each of the cells can function as a serving cell, or a non-serving cell.

Note that the "cell" is basically used as a term representing a function communicating with the radio terminal 10. The "cell" is sometimes used as a term representing an area in which the radio terminal 10 is located.

For example, in FIG. 1, the radio terminal 10 performs a communication according to an instruction from an EUL scheduler provided in the cell A (in other words, the radio terminal performs a communication according to an AG received from the cell A via E-AGCH). In this example, the cell A is a serving cell for the radio terminal 10 and the cells B to D are non-serving cells for the radio terminal 10. Meanwhile, the radio terminal 10 is referred to as a serving terminal for the cell A and as a non-serving terminal for the cells B to D.

Here, the radio terminal 10 has a table associating a transmission power ratio with the transmission rate. This table is used for transmitting the uplink user data via the E-DPDCH. The transmission power ratio is a ratio of a transmission power of the E-DPDCH to a transmission power of the DPCCH (E-DPDCH/DPCCH). The transmission rate is represented by a transport block size (TBS).

The transmission power ratio assigned to the radio terminal 10 will be hereinafter referred to as a scheduling grant (SG). Note that the transmission power ratio and the transmission rate are associated one-to-one with each other. Thus, the scheduling grant (SG) may be considered not only as a term representing the transmission power ratio assigned to the radio terminal 10 but also as a term representing the transmission rate assigned to the radio terminal 10.

The absolute grant (AG) is data (Index) directly specifying the transmission power ratio (E-DPDCH/DPCCH) assigned to the radio terminal 10 (see 3GPP TS25.212 Ver. 7.5.0 4.10.1A.1 "Information field mapping of the Absolute Grant Value").

As described above, the absolute grant (AG) is a command directly specifying the transmission rate value without relying on the current transmission rate.

The relative grant (RG) is data ("Up", "Down" and "Hold") relatively specifying the transmission power ratio (E-DPDCH/DPCCH) assigned to the radio terminal 10 (see 3GPP T825.321 Ver. 7.5.0 9.2.5.2.1 "Relative Grants").

As described above, the relative grant (RG) is a command relatively controlling the current transmission rate. Specifically, the relative grant (RG) includes an increase command "Up" for instructing an increase of the current transmission rate, a retention command "Hold" for instructing a retention of the current transmission rate, and a decrease command "Down" for instructing a decrease of the current transmission rate. Here, the increase command instructs the increase of the transmission rate by a predetermined amount Further, the decrease command instructs the decrease of the transmission rate by a predetermined amount. The predetermined amount for the increase may be the same as or smaller than the predetermined amount for the decrease.

The radio terminal 10 updates the SG according to the transmission rate control data (AG or RG) received from the base station 100a (see 3GPP TS25.321 Ver. 7.5.0 11.8.1.3 "Scheduling grant Update"). Subsequently, the radio terminal 10 determines a transmission rate (that is, TBS) corresponding to the SG by referring to the table associating the transmission power ratio with the transmission rate (see 3GPP TS25.321 Ver. 7.5.0 11.8.1.4 "E-TFC Selection").

The base station 100 transmits the absolute grant (AG) to the radio terminal 10 via the E-DCH absolute grant channel (E-AGCH). The base station 100 transmits the relative grant (RG) to the radio terminal 10 via the E-DCH relative grant channel (E-RGCH).

For example, the serving cell (here, the cell A) transmits the AG to the radio terminal 10 via the E-AGCH and transmits the RG to the radio terminal 10 via the E-RGCH. Meanwhile, the non-serving cell (here, the cell B) transmits the RG to the radio terminal 10 via the E-RGCH without transmitting the AG to the radio terminal 10 via the E-AGCH.

It should be note that, in FIG. 1, the channels (the DPDCH, the DPCCH and the like) used in the R99 are merely omitted for simplifying the description.

It should also be noted that multiple number of the radio terminals 10 existed in each of the cells are omitted in the description. For example, radio terminals 10 that are serving terminals for the respective cells B to D are located. In other words, the radio terminals 10 that are serving terminals for the respective cells B to D are non-serving terminals for the cell A.

Meanwhile, other radio terminals 10 that are the serving terminals for the cell A may be existed in addition to the radio terminal 10 shown in FIG. 1. In other words, other radio terminals 10 that are the serving terminal for the cell A and that are the non-serving terminals for the cells B to D may be existed in addition to the radio terminal 10 shown in FIG. 1.

Further, the cell used as the serving cell by the radio terminal 10 is not limited to one cell but may be more than one cell.

(Configuration of Base Station)

Figure 2:
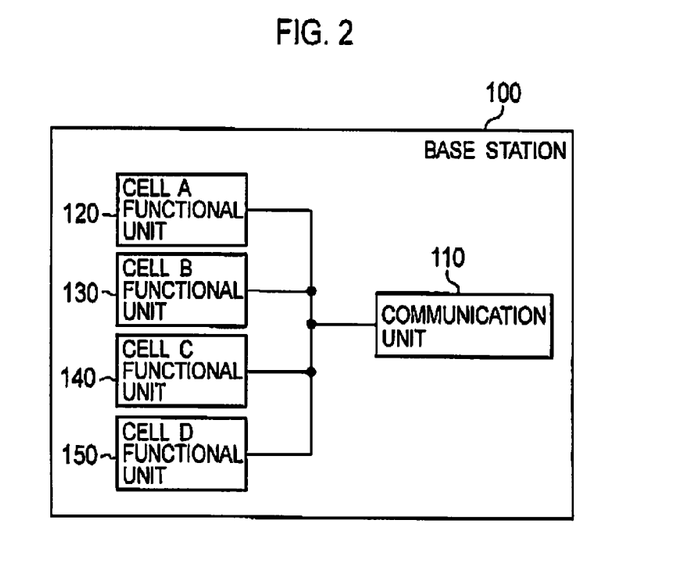
FIG. 2 is a block diagram showing a base station 100 according to the first embodiment.

With reference to the accompanying drawings, description will be given of a configuration of the base station according to the first embodiment. FIG. 2 is a block diagram showing the base station 100 according to the first embodiment.

As shown in FIG. 2, the base station 100 includes a communication unit 110, a cell A functional unit 120, a cell B functional unit 130, a cell C functional unit 140 and a cell D functional unit 150.

The communication unit 110 communicates with the plurality of radio terminals 10 located in the cells A to D, respectively. Specifically, the communication unit 110 receives uplink user data from each of the plurality of radio terminals 10 via the data channel such as the DPDCH or the E-DPDCH. Further, the communication unit 110 receives uplink control data from each of the plurality of radio terminals 10 via the control channel such as the DPCCH or the E-DPCCH. Meanwhile, the communication unit 110 transmits the control data (AG or RG) to each of the plurality of radio terminals 10 via the control channel such as the E-AGCH and the E-RGCH.

Note that the communication unit 110 also communicates with upper apparatuses (such as a radio network controller, a switching apparatus or the like), which controls the base station 100.

The cell A functional unit 120 functions as a serving cell for the radio terminals 10 located in the cell A. Meanwhile, the cell A functional unit 120 functions as a non-serving cell for radio terminals 10 located in the cells B to D.

The cell B functional unit 130 functions as a serving cell for radio terminals 10 located in the cell B. Meanwhile, the cell B functional unit 130 functions as a non-serving cell for radio terminals 10 located in the cells A, C and D.

The cell C functional unit 140 functions as a serving cell for radio terminals 10 located in the cell C. Meanwhile, the cell C functional unit 140 functions as a non-serving cell for radio terminals 10 located in the cells A, B and D.

The cell D functional unit 150 functions as a serving cell for radio terminals 10 located in the cell D. Meanwhile, the cell D functional unit 150 functions as a non-serving call for radio terminals 10 located in the cells A to C.

Note that, detailed description of the cell functioning as a non-serving cell will be given later (see, FIG. 3). Similarly, detailed description of the cell functioning as a serving cell will be given later (see, FIG. 5). The first embodiment will be described for an example in which the cell B (cell B functional unit 130) functions as the non-serving cell and the cell A (cell A functional unit 120) functions as the serving cell.

(Configuration of the Cell Functioning as a Non-Serving Cell)

In the following description, the configuration of the cell functioning as a non-serving cell according to the first embodiment will be described by referring to the accompanying drawings. FIG. 3 is a block diagram showing the cell B (cell B functional unit 130) functioning as a non-serving cell according to the first embodiment. As described above, the cell B functional unit 130 (cell B) functions as a non-serving cell for the radio terminal 10 (that is, the serving radio terminal 10 of the cells A, C, or D) located in the cells A, C, or D.

Figure 3:
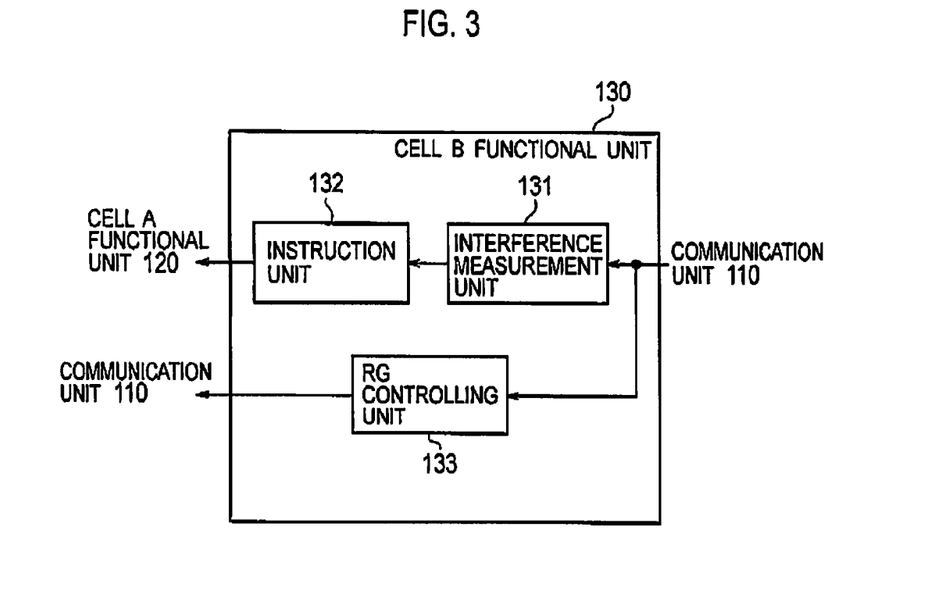
FIG. 3 is a block diagram showing a cell functioning as a non-serving cell according to the first embodiment.

As shown in FIG. 3, the cell B functional unit 130 functions as a non-serving cell includes an interference measuring unit 131, an instruction unit 132, and a RG controlling unit 133.

The interference measuring unit 131 measures a reception power of various kinds of data received from the radio terminal 10 (serving terminal) using the cell B as the serving cell. Further, the interference measuring unit 131 measures the interference power of various kinds of data received form the radio terminal 10 (non-serving terminal) located in a cell other than the cell B. The cell other than the cell B includes not only the cells A, C, and D but also a cell that is included in a base station adjacent to the base station 100.

Figure 4:
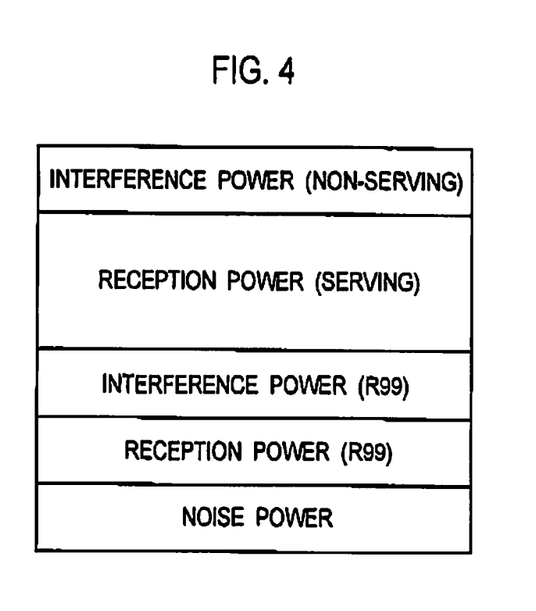
FIG. 4 is a view for describing reception power according to the first embodiment.

Specifically, as shown in FIG. 4, the interference measuring unit 131 measures a noise power, a reception power (R99), an interference power (R99), a reception power (serving), and an interference power (non-serving).

The reception power (R99) indicates the reception power of the uplink user data received from, via the DPDCH, the radio terminal 10 located in the cell B. The interference power (R99) indicates the reception power of the uplink user data received from, via the DPDCH, the radio terminal 10 located in the cell other than the cell B.

The reception power (serving) indicates the reception power of the uplink user data received from, via the E-DPDCH, the radio terminal 10 (serving terminal) located in the cell B. The interference power (non-serving) indicates the reception power of the uplink user data received from, via the E-DPDCH, the radio terminal 10 (non-serving terminal) located in the cell other than the cell B.

The instruction unit 132 determines whether or not the interference power (non-serving) exceeds a predetermined interference threshold. Here, the predetermined interference threshold may be a predetermined fixed value. Alternatively, the predetermined interference threshold may be a value determined by a ratio of the reception power (serving) to the interference power (non-serving).

For example, the predetermined interference threshold, the interference power (non-serving), and the reception power (serving) are respectively expressed by "Th," "I," and "S".

When the predetermined interference threshold "Th" is a fixed value, the instruction unit 132 determines whether or not "I" exceeds "Th."

When the predetermined interference threshold "Th" is a value determined by "I/S", the instruction unit 132 determines whether or not "I" exceeds "Th×S". On the other hand, when the predetermined interference threshold "Th" is a value determined by "S/I", the instruction unit 132 determines whether or not "I" exceeds "S/Th".

When the predetermined interference threshold "Th" is a value determined by "I/(S+I)", the instruction unit 132 determines whether or not "I" exceeds "Th×(S+I)". On the other hand, when the predetermined interference threshold "Th" is a value determined by "(S+I)/I", the instruction unit 132 determines whether or not "I" exceeds "(S+I)/Th".

Subsequently, when the interference power (non-serving) exceeds the predetermined interference threshold, the instruction unit 132 instructs the cell A (cell A functional unit 120) that is the non-serving cell of the radio terminal 10 (non-serving terminal), to decrease a transmission rate assigned to the radio terminal 10 (non-serving cell) using the cell B as the serving cell.

The RG controlling unit 133 transmits, via the E-RGCH, the RG to the radio terminal 10 (non-serving terminal) using the cell B as the non-serving cell. Here, the RG controlling unit 133 of the non-serving terminal of the radio terminal 10, a maintenance command "Hold" or a decrease command "Down" is transmitted as the RG. The RG controlling unit 133 does not transmit an increase command "Up" to the non-serving terminal. As described above, the decrease command "Down" is a command to instruct the decrease of the transmission rate by a predetermined decrease amount.

(Configuration of the Cell Functioning as a Serving Cell)

Figure 5:
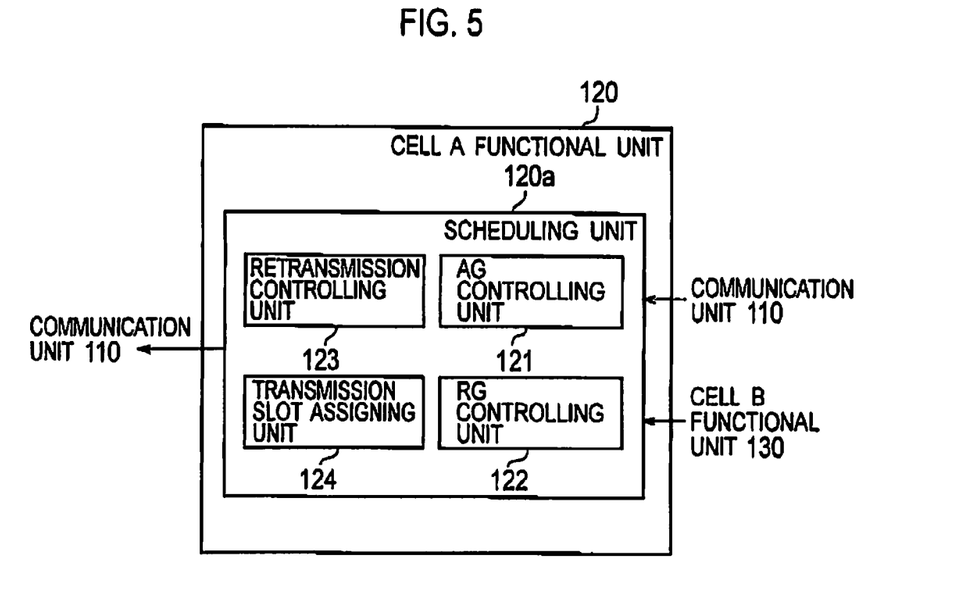
FIG. 5 is a block diagram showing a cell functioning as a serving cell according to the first embodiment.

In the following description, the configuration of the cell functioning as a serving cell according to the first embodiment will be described by referring to the accompanying drawings. FIG. 6 is a block diagram showing the cell A (cell A functional unit 120) functioning as a serving cell according to the first embodiment. As described above, the cell A functional unit 120 (cell A) functions as a serving cell for the radio terminal 10 located in the cell A (that is, the radio terminal 10 using the cell A as a serving cell).

As shown in FIG. 5, the cell A functional unit 120 functioning as a serving cell includes a scheduling unit 120a assigning radio resources or the like, to the radio terminal 10 using the cell A as the serving cell.

The scheduling unit 120a includes an AG controlling unit 121, an RG controlling unit 122, a retransmission controlling unit 123 and a transmission slot assigning unit 124. The scheduling unit 120a is operated in a MAC-e (Media Access Control Enhanced) layer.

The AG controlling unit 121 transmits the AG via the E-AGCH to the radio terminal 10. Note that the AG is a command for directly specifying a value of the transmission rate without relying on the current transmission rate.

The RG controlling unit 122 transmits an RG via the E-RGCH to the radio terminal 10 (serving radio terminal of the cell A). Note that the RG includes the increase command "Up" for instructing the increase of the current transmission rate, the retention command "Hold" for instructing the retention of the current transmission rate, and the decrease command "Down" for instructing the decrease of the current transmission rate. As described above, the increase command "Up" instructs the increase of the transmission rate by a predetermined amount and the decrease command "Down" instructs the decrease by a predetermined amount. The predetermined amount for the increase may be the same as or smaller than the predetermined amount for the is decrease.

The retransmission controlling unit 123 determines, for each block (for each process), whether or not an error is occurred in the uplink user data. Thereafter, the retransmission controlling unit 123 requests the radio terminal 10 to retransmit a block in which an error is occurred (hereinafter referred to as an error block). Here, a retransmission control technique is a HARQ (Hybrid Automatic Repeat Request) technique for combining a block firstly transmitted from the radio terminal 10 (hereinafter referred to as a transmission block) with a block retransmitted from the radio terminal 10 (hereinafter referred to as a retransmission block).

The transmission slot assigning unit 124 assigns, to the radio terminal 10, a transmission slot (that is, a process included in one TTI) to be used for transmitting the uplink user data (block) via the E-DPDCH. Note that the radio terminal 10 transmits the transmission block or the retransmission block to the base station 100 by using the process assigned by the transmission slot assigning unit 124.

Here, when the cell B (cell B functional unit 130) that is the non-serving cell of the radio terminal 10 instructs the cell A functional unit 120 to decrease the transmission rate assigned to the radio terminal 10, the cell A functional unit 120 decreases the uplink user data transmission rate to be transmitted from the radio terminal 10 via the E-DPDCH. To be more specific, the above-described AG controlling unit 121 or RG controlling unit 122 transmits the AG or the RG, to the radio terminal 10 (serving terminal) using the cell A as the serving cell. Thereby, the transmission rate assigned to the radio terminal 10 (serving terminal) is decreased and thus the interference power (non-serving) for the cell B that is the non-serving cell of the radio terminal 10 is decreased.

Note that, the RG is control data for relatively specifying the transmission rate, and the AG is the control data for directly specifying the transmission rate. Accordingly, it is preferable that the transmission rate is decreased by the AG, when immediate transmission rate decrease is required.

(Operations of the Cell Functioning as a Non-Serving Cell)

Figure 6:
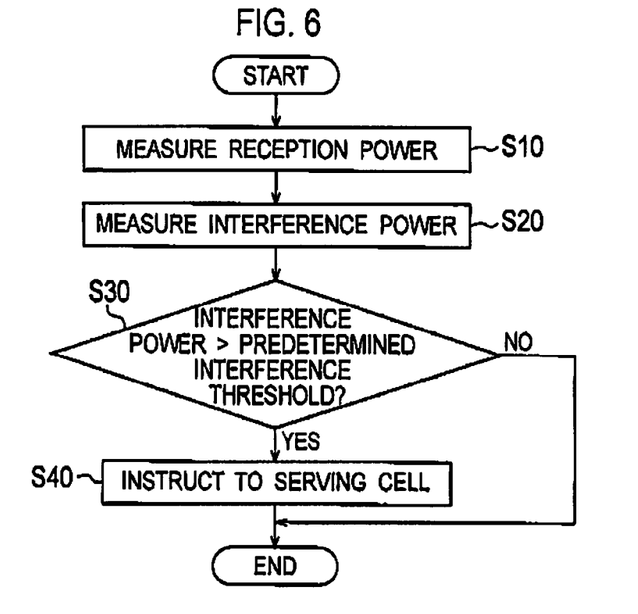
FIG. 6 is a flowchart showing operations of the cell functioning as a non-serving cell according to the first embodiment.

In the following description, operations of the cell functioning as the non-serving cell according to the first embodiment will be described by referring to the accompanying drawings. FIG. 6 is a flowchart showing operations of the cell B (cell B functional unit 130) functioning as a non-serving cell according to the first embodiment.

As shown in FIG. 6, in step S10, the cell B functional unit 130 measures the reception power (reception power (serving)) of the uplink user data received from, via the E-DPDCH, the radio terminal 10 using the cell B as the serving cell.

In step S20, the cell B functional unit 130 measures the reception power (interference power (non-serving)) of the uplink user data received from, via the E-DPDCH, the radio terminal 10 using a cell other than the cell B as the serving cell.

In step S30, the cell B functional unit 130 determines whether or not the interference power (non-serving) exceeds a predetermined interference threshold. Note that, as described above, the predetermined interference threshold may be a predetermined fixed value or a value determined by a ratio of the reception power (serving) to the interference power (non-serving).

When the interference power (non-serving) exceeds the predetermined interference threshold, the cell B functional unit 130 proceeds to the processing in step S40. On the other hand, when the interference power (non-serving) is equals to or less than the predetermined interference threshold, the cell B functional unit 130 terminates the processings.

In step S40, the cell B functional unit 130 instructs the cell (for example, cell A functional unit 120) that is the serving cell of the radio terminal 10, to decrease the transmission rate assigned to the radio terminal 10 using the cell B as the non-serving cell.

When the cell A functional unit 120 receives the instruction from the cell B functional unit 130, the cell A functional unit 120 transmits the AG or the RG so as to decrease the transmission rate assigned to the radio terminal 10 using the cell A as the serving cell.

(Operations and Effects)

In the first embodiment, the cell B functional unit 130 instructs the cell A (cell A functional unit 120) that is the serving cell of the radio terminal 10 (non-serving terminal), to decrease the uplink user data transmission rate, when the interference power (non-serving) exceeds the predetermined interference threshold.

In other words, the cell A functional unit 120 functioning as a serving cell decreases the transmission rate assigned to the radio terminal 10. Accordingly, it is possible to appropriately suppress the interference power caused in the cell B functional unit 130 functioning as a non-serving cell of the radio terminal 10, without depending on the radio network controller. Note that, it is needless to say that the cell A functional unit 120 functioning as a serving cell, recognizes the transmission rate assigned to the radio terminal 10.

Second Embodiment

Next, a second embodiment of the present invention will be described below by referring to the accompanying drawings. In the following description, differences between the first embodiment and the second embodiment will be mainly described.

Specifically, although it is not particularly mentioned in the first embodiment, a cell B functional unit 130 functioning as a non-serving cell selects, from the plurality of radio terminals 10 (non-serving terminals), a radio terminal 10 whose uplink user data transmission rate transmitted via E-DPDCH is to be decreased. Subsequently, the cell B functional unit 130 functioning as a non-serving cell instructs a cell that is a serving cell of the selected radio terminal 10 (non-serving terminal) to decrease the transmission rate of the selected radio terminal 10 (non-serving terminal).

(Configuration of the Cell Functioning as a Non-Serving Cell)

Figure 7:
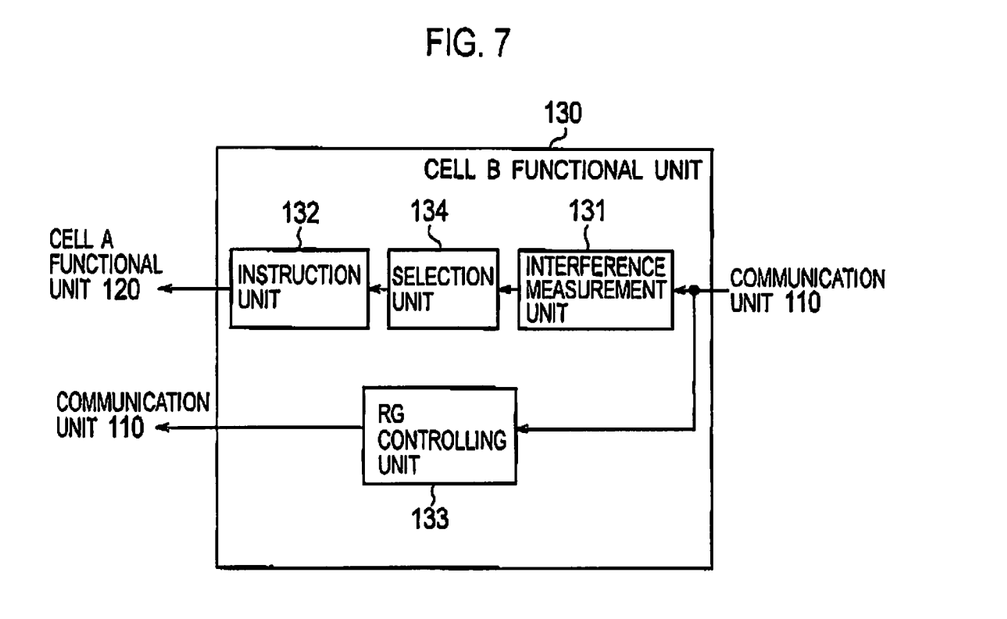
FIG. 7 is a block diagram showing a cell functioning as a non-serving cell according to a second embodiment.

In the following description, the configuration of the cell functioning as a non-serving cell according to the second embodiment will be described by referring to the accompanying drawings. FIG. 7 is a block diagram showing cell B (cell B functional unit 130) functioning as a non-serving cell according to the second embodiment. Note that, in FIG. 7, same reference numerals are given to denote components similar to those of FIG. 3.

As shown in FIG. 7, the cell B functional unit 130 functioning as a non-serving cell includes a selection unit 134 in addition to the configuration shown in FIG. 3.

The selection unit 134 selects, from the plurality of radio terminals 10 (non-serving terminals), a radio terminal 10 whose uplink user data transmission rate transmitted via E-DPDCH is to be decreased, when the interference power (non-serving) exceeds a predetermined interference threshold.

For example, the selection unit 134 may select, from the plurality of radio terminals 10 (non-serving terminals), a radio transmission 10 whose interference power (non-serving) is larger than a predetermined interference power. Alternatively, the selection unit 134 may select, from the plurality of radio terminals (non-serving terminals), a radio terminal 10 performing a handover from other cell to the cell B.

An instruction unit 132 notifies, to the cell that is the serving cell of the radio terminal 10 (non-serving terminal), the transmission rate of the radio terminal 10 (non-serving terminal) selected by the selection unit 134.

(Operations of the Cell Functioning as a Non-Serving Cell)

Figure 8:
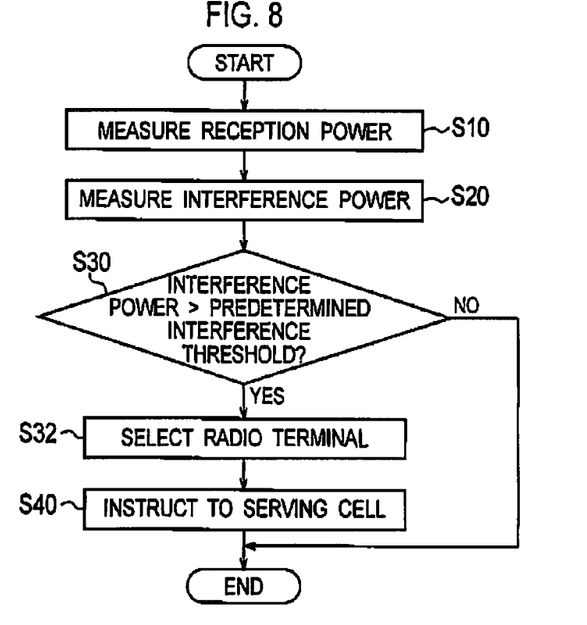
FIG. 8 is a flowchart showing operations of the cell functioning as a non-serving cell according to the second embodiment.

In the following description, operations of the cell functioning as a non-serving cell according to the second embodiment will be described by referring to the accompanying drawings. FIG. 8 is a flowchart showing operations of the cell B (cell B functional unit 130) functioning as a non-serving cell according to the second embodiment. Note that, in FIG. 8, same step numbers are given to denote processes similar to those of FIG. 6.

As shown in FIG. 8, in step S32, the cell B functional unit 130 selects, from the plurality of radio terminals 10 (non-serving terminals), a radio terminal 10 whose uplink user data transmission rate transmitted via the E-DPDCH is to be decreased.

Note that, in step S40, the cell B functional unit 130 notifies, to the cell (for example, cell A functional unit 120) that is the serving cell of the radio terminal 10 (non-serving terminal) selected in step S32, the radio terminal 10 selected in step S32

(Operations and Effects)

In the second embodiment, the cell B functional unit 130 functioning as a non-serving cell selects, from the plurality of radio terminals 10 (non-serving terminals), the radio terminal 10 whose transmission rate is to be decreased, when the interference power (non-serving) exceeds the predetermined interference threshold. Accordingly, the interference power to the cell B functional unit 130 functioning as a non-serving cell can be effectively suppressed.

Third Embodiment

Next, a third embodiment of the present invention will be described below by referring to the accompanying drawings. In the following description, differences between the first embodiment and the third embodiment will be mainly described.

Specifically, although it is not particularly mentioned in the first embodiment, a cell B functional unit 130 functioning as a non-serving cell determines a decrease amount of the uplink user data transmission rate assigned to the radio terminal 10 (non-serving terminal). Subsequently, the cell B functional unit 130 functioning as a non-serving cell notifies the determined decreased amount, to the cell that is the serving cell of the radio terminal 10 (non-serving terminal).

(Configuration of the Cell Functioning as a Non-Serving Cell)

Figure 9:
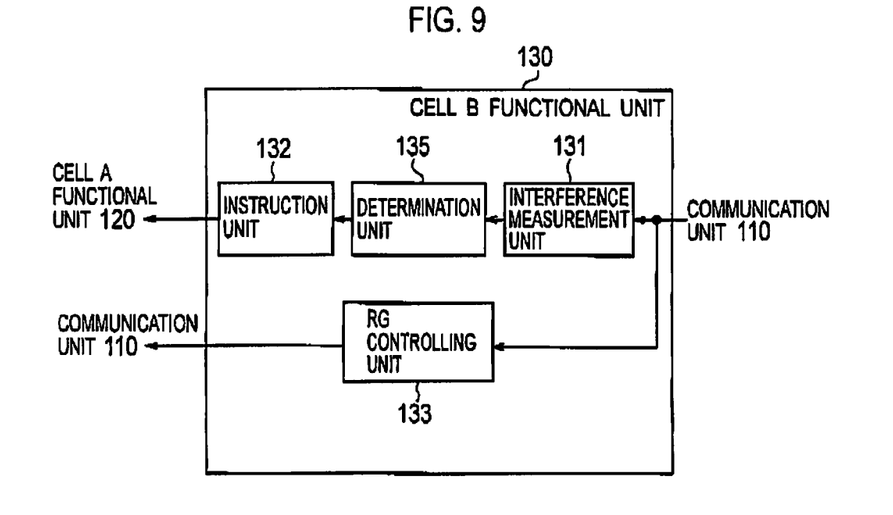
FIG. 9 is a block diagram showing a cell functioning as a non-serving cell according to a third embodiment.

In the following description, the configuration of the cell functioning as a non-serving cell according to a third embodiment will be described by referring to the accompanying drawings. FIG. 9 is a block diagram showing the cell B (cell B functional unit 130) functioning as a non-serving cell according to the third embodiment. Note that, in FIG. 9, same reference numerals are given to denote components similar to those of FIG. 3.

As shown in FIG. 9, the cell B functional unit 130 functioning as a non-serving cell includes a determination unit 135 in addition to the configuration shown in FIG. 3.

The determination unit 135 determines a decrease amount of a transmission rate assigned to the radio terminal 10 (non-serving terminal), when the interference power (non-serving) exceeds a predetermined interference threshold. More specifically, the determination unit 135 determines the decrease amount of the transmission rate so that the interference power (non-serving) is not decreased to below the predetermined interference threshold.

An instruction unit 132 notifies, to the cell that is the serving cell of the radio terminal 10 (non-serving terminal), the decrease amount of the transmission rate determined by the determination unit 135.

(Operations of the Cell Functioning as a Non-Serving Cell)

Figure 10:
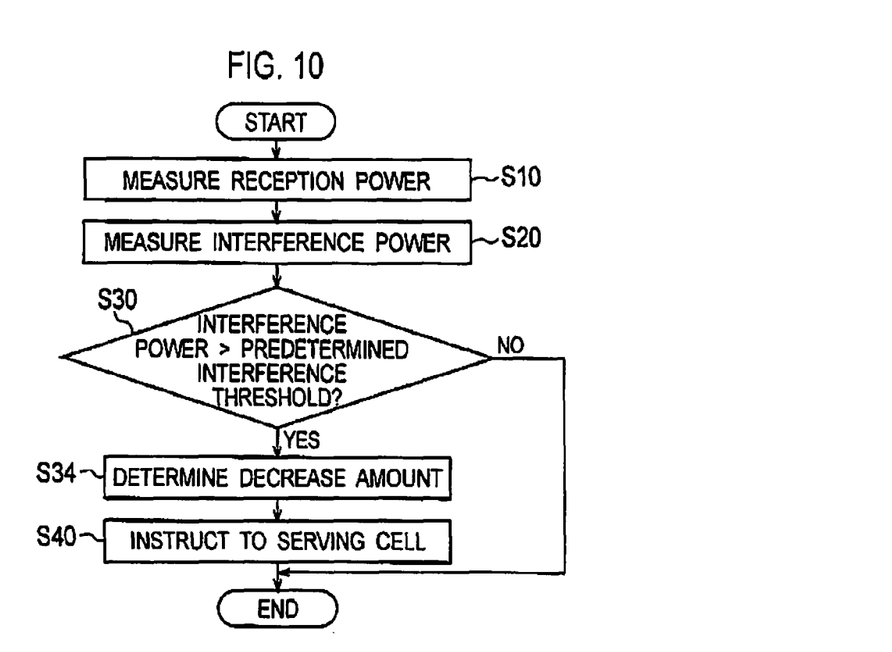
FIG. 10 is a flowchart showing operations of the cell functioning as a non-serving cell according to the third embodiment.

In the following description, operations of the cell functioning as a non-serving cell according to the third embodiment will be described by referring to the accompanying drawings. FIG. 10 is a flowchart showing operations of the cell B (cell B functional unit 130) functioning as a non-serving cell according to the third embodiment. Note that, in FIG. 10, same step numerals are given to denote processes similar to those of FIG. 6.

As shown in FIG. 10, in step S34, the cell B functional unit 130 determines the decrease amount of the transmission rate assigned to the radio terminal 10 (non-serving terminal).

Note that, in step S40, the cell B functional unit 130 notifies, to the cell that is the serving cell of the radio terminal 10 (non-serving terminal), the decrease amount determined in step S34.

(Operations and Effects)

In the third embodiment, the cell B functional unit 130 functioning as a non-serving cell determines the decrease amount of the transmission rate, when the interference power (non-serving) exceeds the predetermined interference threshold. Accordingly, the interference power to the cell B functional unit 130 functioning as a non-serving cell can be effectively suppressed.

Fourth Embodiment

Next, a fourth embodiment of the present invention will be described below by referring to the accompanying drawings. In the following description, differences between the first embodiment and the fourth embodiment will be mainly described.

Specifically, although it is not particularly mentioned in the first embodiment, a cell A functional unit 120 functioning as a serving cell selects, from the plurality of radio terminals 10 (serving terminals), a radio terminal 10 whose transmission rate is to be decreased, when the cell that is the non-serving cell of the radio terminal 10 (serving terminal) instructs the cell A to decrease a transmission rate.

(Configuration of the Cell Functioning as a Serving Cell)

Figure 11:
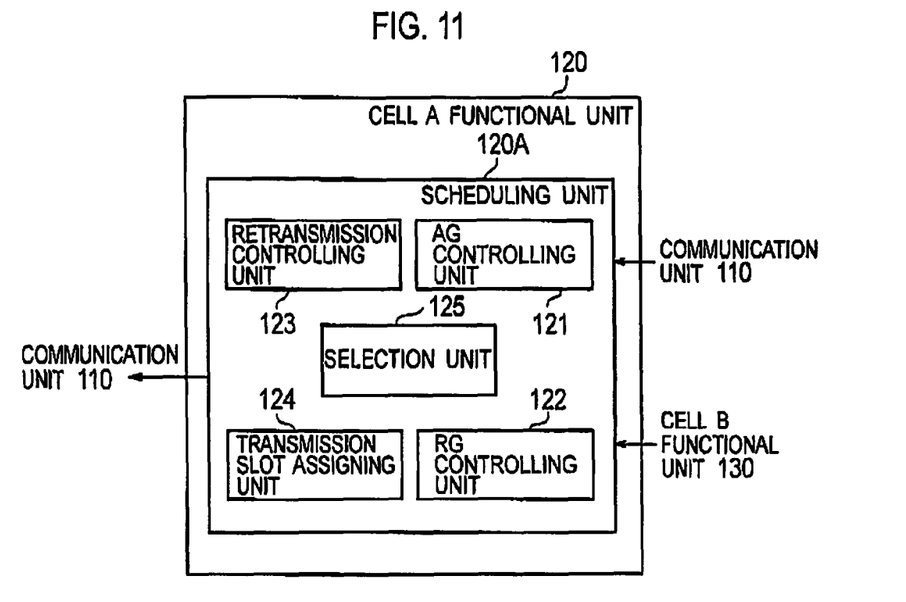
FIG. 11 is a block diagram showing a cell functioning as serving cell according to a fourth embodiment.

In the following description, the configuration of the cell functioning as a serving cell according to the fourth embodiment will be described by referring to the accompanying drawings. FIG. 11 is a block diagram showing a cell (cell A functional unit 120) functioning as a serving cell according to the fourth embodiment. Note that, in FIG. 11, same reference numerals are given to denote components similar to those of FIG. 5.

As shown in FIG. 11, the cell A functional unit 120 includes a selection unit 125 in addition to the configuration shown in FIG. 5.

The selection unit 125 selects, from the plurality of radio terminals (serving terminals), a radio terminal 10 whose uplink user data transmission rate is to be decreased, when the cell that is the non-serving cell of the radio terminal 10 (serving terminal 10) instructs the cell A functional unit 120 to decrease the uplink user data transmission rate transmitted via E-DPDCH.

For example, the selection unit 125 may select, from the plurality of radio terminals 10 (serving terminals), a radio terminal 10 whose transmission rate is larger than a predetermined transmission rate. Alternatively, the selection unit 125 may select, from the plurality of radio terminals 10 (serving terminals), a radio terminal 10 performing a handover from the cell A to other cell.

(Operations and Effects)

In the fourth embodiment, the cell A functional unit 120 functioning as a serving cell selects, from the plurality of radio terminals 10 (serving terminals), the radio terminal 10 whose transmission rate is to be decreased, when the cell that is the non-serving cell of the radio terminal 10 (serving terminal) instructs the cell A to decrease the transmission rate.

Accordingly, while controlling the decrease of the transmission rate assigned to the serving terminal, the cell A functional unit 120 can appropriately suppress the interference power to the cell B functional unit 130 functioning as a non-serving cell.

Here, the control data transmitted from the non-serving cell to the serving cell only includes the data instructing the decrease of the transmission rate. Accordingly, the amount of the control data transmitted from the non-serving cell to the serving cell may be smaller than that of the second and third embodiments.

Additionally, each of the cells is required to monitor only the radio terminal 10 (serving terminal) using the own cell as the serving cell. Accordingly, the number of the radio terminals 10 to be monitored by each of the cells can be minimized.

Fifth Embodiment

Next, a fifth embodiment of the present invention will be described below by referring to the accompanying drawings. In the following description, differences between the first embodiment and the fifth embodiment will be mainly described.

Specifically, although it is not particularly mentioned in the first embodiment, a cell A functional unit 120 functioning as a serving cell determines a decrease amount of a transmission rate, when the cell that is the non-serving cell of a radio terminal 10 (serving terminal) instructs the cell A functional unit 120 to decrease the transmission rate.

(Configuration of the Cell Functioning as a Serving Cell)

Figure 12:
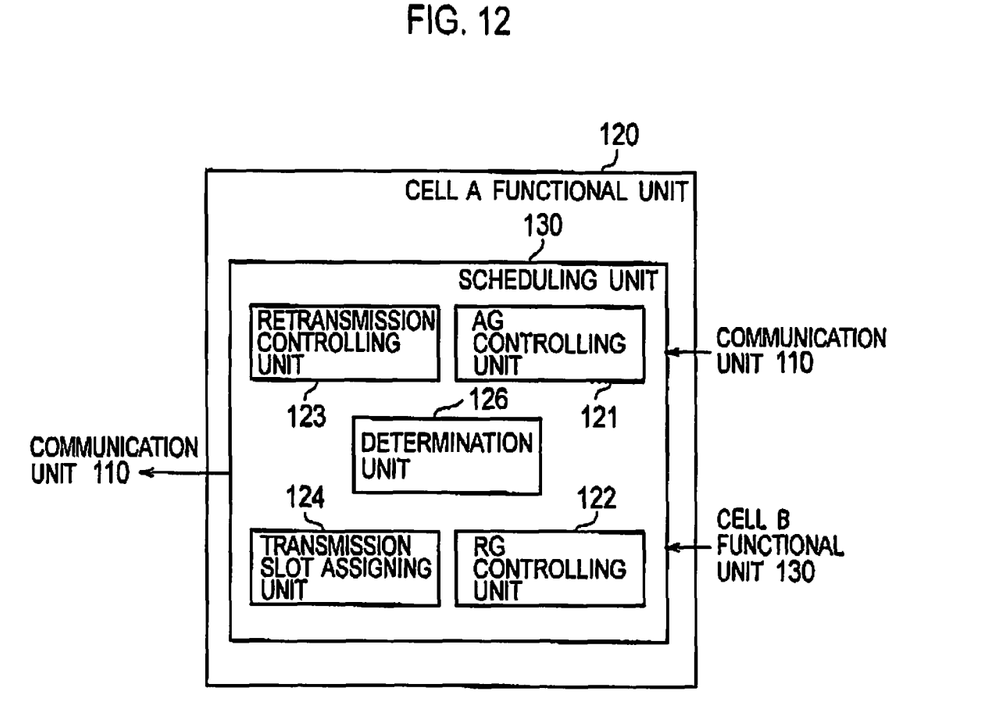
FIG. 12 is a block diagram showing a cell functioning as a serving cell according to a fifth embodiment.

In the following description, the configuration of the cell functioning as a serving cell according to the fifth embodiment will be described by referring to the accompanying drawings. FIG. 12 is a block diagram showing a cell (cell A functional unit 120) functioning as a serving cell according to the fifth embodiment. Note that, in FIG. 12, same reference numerals are given to denote components similar to those of FIG. 5.

As shown in FIG. 12, the cell A functional unit 120 includes a determination unit 126 in addition to the configuration shown in FIG. 5.

The determination unit 126 determines a decrease amount of the transmission rate assigned to the radio terminal 10 (serving terminal), when a cell that is the non-serving cell of the radio terminal 10 (serving terminal) instructs the cell A functional unit 120 to decrease the uplink user data transmission rate transmitted via E-DPDCH. Specifically, the determination unit 126 determines the decrease amount of the transmission rate so that the transmission rate of the radio terminal 10 is not decreased to below a predetermined transmission rate.

(Operations and Effects)

In the fifth embodiment, the cell A functional unit 120 functioning as a serving cell determines the decrease amount of the transmission rate, when the cell that is the non-serving cell of a radio terminal 10 (serving terminal) instructs the cell A functional unit 120 to decrease the transmission rate.

Accordingly, while controlling the decrease of the transmission rate assigned to the serving terminal, the cell A functional unit 120 can appropriately suppress the interference power to the cell B functional unit 130 functioning as a non-serving cell.

Sixth Embodiment

Next, a sixth embodiment of the present invention will be described below by referring to the accompanying drawings. In the following description, differences between the first embodiment and the sixth embodiment will be mainly described.

In the first embodiment, the description has been given for the case where the serving cell and the non-serving cell are controlled by the same base station. On the other hand, in the sixth embodiment, a description will be given for a case where a serving cell and a non-serving cell are controlled by the different base stations.

(Configuration of a Radio Communication System)

Figure 13:
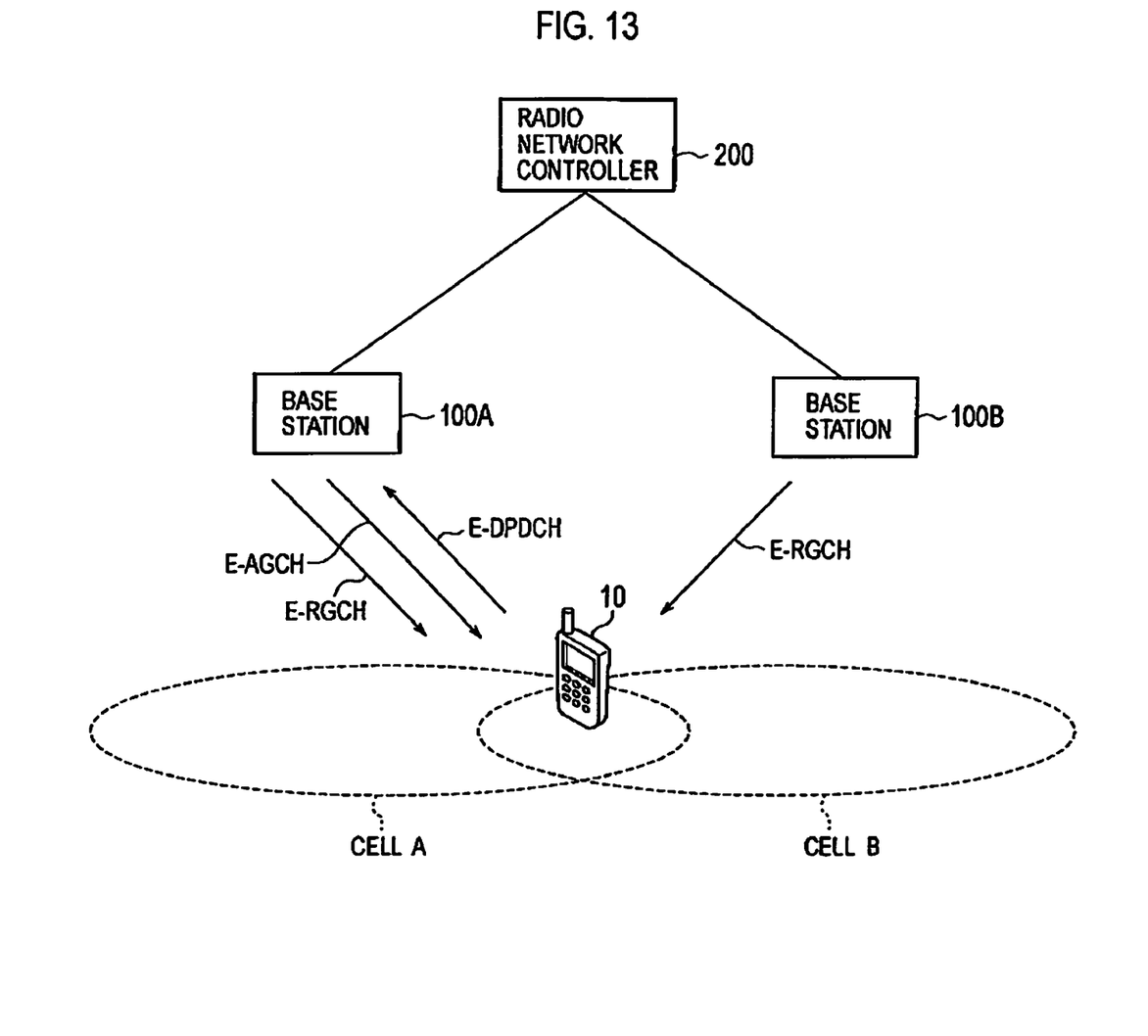
FIG. 13 is a view showing a radio communication system according to a sixth embodiment.

In the following description, the configuration of a radio communication system according to the sixth embodiment will be described by referring to the accompanying drawings, FIG. 13 is a view showing the radio communication system according to the sixth embodiment.

As shown in FIG. 13, the radio communication system includes a radio terminal 10, a plurality of base stations 100 (base stations 100*a* and 100*b*), and a radio network controller 200.

The base station 100*a* controls a cell A, and the base station 100*b* controls a cell B. For example, the cell A controlled by the base station 100*a* is a serving cell of the radio terminal 10. On the other hand, the cell B controlled by the base station 100*b* is a non-serving cell of the radio terminal 10.

The radio network controller 200 transmits a node B application protocol (NBAP) message (such as radio link information or the like) to each base station 100.

In such case, similar to the first embodiment, the cell B functioning as a non-serving cell instructs the cell A used by the radio terminal 10 as the serving cell, to decrease uplink user data transmission rate transmitted via E-DPDCH, when the interference power (non-serving) exceeds a predetermined interference threshold.

Other Embodiments

The present invention has been described by using the above-described embodiments. However, it should not be construed that the description and the drawings, which constitute one part of this disclosure, are to limit the present invention. Various alternative embodiments, examples, and operational techniques will be obvious for those who are in the art from this disclosure.

For example, the above-described second to fifth embodiments may be applied to the sixth embodiment.

The above-described second and third embodiments may be combined. Specifically, when the interference power (non-serving) exceeds the predetermined interference threshold, the cell B (cell B functional unit 130) functioning as a non-serving cell may select, from the plurality of radio terminals 10 (non-serving terminals), the radio terminal 10 whose transmission rate is to be decreased, before the cell B determines the decrease amount of the transmission rate assigned to the radio terminal 10.

Moreover, the above-described fourth and fifth embodiments may be combined. Specifically, when the interference power (non-serving) exceeds the predetermined interference threshold, the cell A (cell A functional unit 120) functioning as a serving cell may select, from the plurality of radio terminals 10 (serving terminals), a radio terminal 10 whose transmission rate is to be decreased, before the cell A determines the decrease amount of the transmission rate assigned to the radio terminal 10.

In the above-described embodiments, the case where the cell B functions as a non-serving cell and the cell A functions as a serving cell are mainly described. However, the present invention is not limited to this configuration. Specifically, the cell B may individually instruct the cells A, C, and D to decrease the transmission rate on the assumption that the cell B functions as a non-serving cell and the cells A, C, and D functions as serving cells.

Though it is not particularly mentioned in the above embodiments, the serving terminal and the non-serving terminal can be identified in the following manner. Specifically, by using the radio link information transmitted from the radio network controller 200 to the base station 100, each of the cell associates the radio terminal 10 which sets the radio link, with the cell in which the radio link is set. Note that, the radio link information includes identifiers of the radio link and the cell. The radio link information is included in, for example, "RADIO LINK SETUP REQUEST", "RADIO LINK ADDITION REQUEST", "RADIO LINK RECONFIGURATION PREPARE", and "RADIO LINK DELETION REQUEST" and the like.

Each of the cell recognizes the radio terminal 10 using the own cell as a serving cell, and the identifier of the set radio link. Note that, the identifier of the radio link is included in "Serving E-DCH RL" and the like.

Each of the cell can recognize whether the radio terminal 10 is a serving terminal for the own cell, by using the identifier of the radio link included in the radio link information and the identifier of the radio link whose own cell is used as a serving cell.

What is claimed is:

1. A radio communication system including: a serving cell configured to transmit, to a radio terminal, an absolute grant for directly specifying an uplink user data transmission rate and a relative grant for relatively specifying the uplink user data transmission rate: and a non-serving cell configured to transmit the relative grant to the radio terminal without transmitting the absolute grant, wherein
the non-serving cell includes an instruction unit configured to instruct the serving cell to decrease the uplink user data transmission rate, when a reception power of uplink user data exceeds a predetermined interference threshold.

2. The radio communication system according to claim 1, wherein
the non-serving cell includes a first selection unit configured to select, from a plurality of radio terminals, a radio terminal whose uplink user data transmission rate is to be decreased, when the reception power of the uplink user data exceeds the predetermined interference threshold, and
the instruction unit notifies, to the serving cell, the radio terminal selected by the first selection unit.

3. The radio communication system according to claim 1, wherein
the non-serving cell includes a first determination unit configured to determine a decrease amount of the uplink user data transmission rate, when the reception power of the uplink user data exceeds the predetermined interference threshold, and
the instruction unit notifies, to the serving cell, the decrease amount determined by the first determination unit.

4. The radio communication system according to claim 1, wherein
the serving cell includes a second selection unit configured to select, from a plurality of radio terminals, a radio terminal whose uplink user data transmission rate is to be decreased, when the non-serving cell instructs the serving cell to decrease the uplink user data transmission rate.

5. The radio communication system according to claim 1, wherein the serving cell includes a second determination unit configured to determine a decrease amount of the uplink user data transmission rate, when the non-serving cell instructs the serving cell to decrease the uplink user data transmission rate.

6. The radio communication system according to claim 4, wherein the second selection unit selects a radio terminal having an uplink user data transmission rate larger than a predetermined transmission rate.

7. The radio communication system according to claim 4, wherein the second selection unit selects a radio terminal performing a handover from the serving cell to the non-serving cell.

8. The radio communication system according to claim 5, wherein the decrease amount is determined not to decrease the uplink user data transmission rate to below a predetermined transmission rate.

9. A radio communication method including a serving cell configured to transmit, to a radio terminal, an absolute grant for directly specifying an uplink user data transmission rate and a relative grant for relatively specifying the uplink user data transmission rate; and a non-serving cell configured to transmit the relative grant to the radio terminal without transmitting the absolute grant, comprising:
instructing, from the non-serving cell to the serving cell, to decrease the uplink user data transmission rate, when a reception power of uplink user data exceeds a predetermined interference threshold.

10. A base station provided in a radio communication system including: a serving cell configured to transmit, to a radio terminal, an absolute grant for directly specifying an uplink user data transmission rate and a relative grant for relatively specifying the uplink user data transmission rate; and a non-serving cell configured to transmit the relative grant to the radio terminal without transmitting the absolute grant, wherein
the base station includes the non-serving cell including an instruction unit configured to instruct the serving cell to decrease the uplink user data transmission rate when a reception power of uplink user data exceeds a predetermined interference threshold.

* * * * *